United States Patent [19]
Blank et al.

[11] 4,067,514
[45] Jan. 10, 1978

[54] FILM CASSETTE

[75] Inventors: Rudolf Blank, Cologne-Dunnwald; Achim Kluczynski, Porz-Eil, both of Germany

[73] Assignee: AGFA-Gevaert, A.G., Leverkusen, Germany

[21] Appl. No.: 715,327

[22] Filed: Aug. 18, 1976

[30] Foreign Application Priority Data

Aug. 29, 1975 Germany .............................. 2538425

[51] Int. Cl.$^2$ ........................ G03B 17/26; G03B 17/30
[52] U.S. Cl. ................................................. 242/194
[58] Field of Search ............. 242/194, 193, 197, 71.1, 242/198, 199, 200; 352/72, 78 R, 156

[56] References Cited

U.S. PATENT DOCUMENTS

| 3,599,894 | 8/1971 | Edwards | 242/194 |
| 3,794,269 | 2/1974 | Hoover | 242/194 |

FOREIGN PATENT DOCUMENTS

| 1,395,825 | 5/1975 | United Kingdom | 242/194 |

Primary Examiner—George F. Mautz
Attorney, Agent, or Firm—Michael J. Striker

[57] ABSTRACT

A film cassette has a casing, and a take-up core is mounted in the casing for rotation in opposite directions. An arresting element is connected to the core for joint rotation therewith and is biased toward a position in which it moves in a path during such rotation. A plurality of detent members is provided on the casing so as to extend into said path when the core is assembled with the casing, and each of them has a detent surface against which the arresting element abuts when it is attempted to rotate the core in one direction, and a guide surface which deflects the arresting element out of said path when the core rotates in the opposite direction. The core may include a stub on which the arresting element is provided, and an annular portion surrounding the stub. The arresting element may have a support portion connected to the stub, and an arresting portion which cooperates with the detent element. Two protective projections may surround the support portion in circumferential direction of the core and with spacing therefrom and at least one shearing projection may be provided at one of the protective projections which shears the support portion from the arresting portion when a force exerted upon the arresting portion by the detent element during the attempt to rotate the core in said one direction exceeds a predetermined magnitude.

10 Claims, 1 Drawing Figure

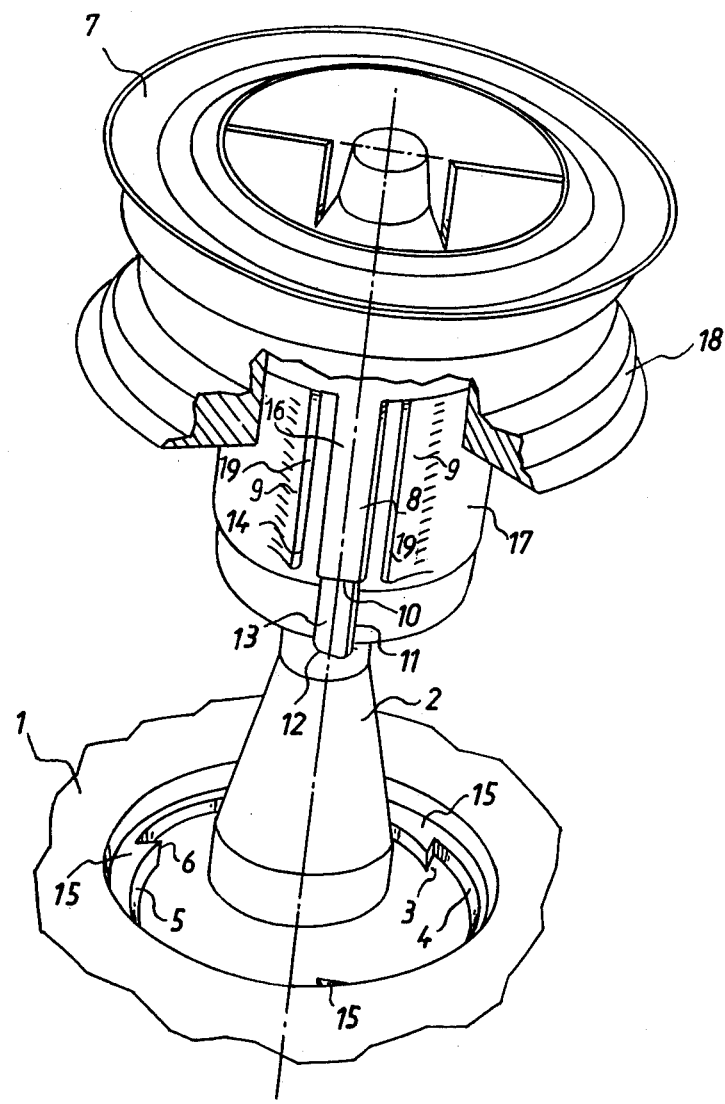

FILM CASSETTE

BACKGROUND OF THE INVENTION

The present invention relates to film cassettes in general, and more particularly to film cassettes for use in amateur-type movie-cameras.

Many types of such film cassettes are already on the market, and at least some of the conventional film cassettes are so constructed that the take-up reel or spool is prevented from rotating in a direction opposite to the intended direction of advancement of the film strip from the pay-out reel or spool to the take-up reel or spool.

Experience with these conventional film cassettes has shown that they are disadvantageous in some respects. So, for instance, some of the cassettes do not provide for reverse advancement of the film strip from the take-up reel or spool under any circumstances, which is very disadvantageous when it is desired, for some reason, to remove the exposed film strip from the cassette, such as through the picture window. In other film cassettes, such removal is possible only in a cumbersome way and may involve damage to the film strip.

SUMMARY OF THE INVENTION

It is a general object of the present invention to avoid the disadvantages of the prior art.

More particularly, it is an object of the present invention to provide a film cassette which is not possessed of the above-mentioned disadvantages.

It is yet another object of the present invention to so construct the arrangement which prevents the rotation of the take-up spool or reel that the arresting force of the arrangement is overcome when a predetermined force is applied to the film strip.

It is still another object of the present invention to so construct the arresting arrangement that, at overcoming the arresting force, the take-up reel or spool is free to rotate in a direction opposite to that of the normal operation.

It is a concomitant object of the present invention to so construct the arresting arrangement that the cassette can be reused at exchange of the take-up reel or spool.

Yet another object of the present invention is to devise a film cassette in which the film strip is not scratched or otherwise damaged by fragments which may be present in the interior of the cassette.

In pursuance of these objects and others which will become apparent hereafter, one feature of the present invention resides, briefly stated, in a film cassette, in a combination comprising a casing; a take-up core mounted in said casing for rotation in opposite directions; and means for arresting said core against rotation in one of said directions, including an arresting element connected to said core for joint rotation therewith, biasing means for urging said arresting element toward a position in which said arresting element moves in a path during said joint rotation, and at least one detent member on said casing which projects into said path and has a detent surface against which said arresting element abuts when moving in said one direction, said detent member also having a curved guide surface which deflects said arresting element out of said path when moving in the opposite direction. It is currently preferred that said arresting element be an integral part of said core, and that at least a portion but preferably the entire arresting element be resiliently yieldable to constitute said biasing means.

According to a further aspect of the present invention, said arresting element may include a support portion which is connected to said core, and an arresting portion cooperating with said detent element and connected to said support portion for being sheared therefrom when a force resulting from the abutment of said arresting portion with said detent surface of said detent element exceeds a predetermined magnitude. The arresting portion may have a radially outer surface which is curved in conformance with said guide surface. Preferably said detent surface may be inclined from the edge at which said detent surface and said guide surface meet in said one direction of rotation.

The core may include a stub and an annular portion which circumferentially surrounds said stub, and said arresting may be connected to said stub. Protective projections may surround said support portion with spacing therefrom in the circumferential direction of said core, said protective projections preferably extending substantially parallel to said support and being substantially coextensive therewith. A shearing projection may be provided on said core, and preferably on said stub, at the trailing one of said protective projections when considered in said one direction of rotation, the shearing projection being operative for shearing said arresting portion from said support portion when a force exerted upon said arresting portion by said detent element during said rotation in said one direction exceeds a predetermined magnitude.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The sole FIGURE of the drawing is an exploded perspective view of a core and of a fragment of a casing of the film cassette of the present invention.

DETAILED DESCRIPTION OF THE PREFERRED EMBODIMENT

The present invention will now be discussed as embodied in a film cassette which is adapted to accommodate a film strip for use in a amateur-type movie camera, such as a Super 8 film. However, it is to be understood that the concept of the present invention can be also utilized in cassettes of different types and/or adapted to accommodate film strips of different sizes.

The cassette includes a casing 1 of which only a fragment has been illustrated in the drawing. The other parts of the cassette, except for the take-up core 7, are of conventional construction and thus have not been illustrated in the drawing. In fact, the part of the casing 1 which is illustrated is a partitioning wall which is located between the take-up core 7 and a non-illustrated supply reel. However, any other wall or part of the casing 1 could serve the same purpose.

A cone-shaped element 2 is provided on the casing 1 and serves to rotationally support the take-up core 7 on the casing 1. Three detent elements, for instance, which have been identified by a reference numeral 15, are provided in a depression formed in the casing 1, each of which detent elements 15 has a base surface 4, a curved guide surface 5 which extends between the base surface 4 and gradually decreasing in distance from the axis of rotation of the core 7, the guide surface 5 ending in an edge 6, and an abutment surface 3 which extends between the edge 6 and the base surface 4.

The core 7 has an arresting element 8 which is connected to the core 7 for joint rotation therewith, the arresting element 8 including a support portion 16 and an arresting portion 13 which cooperates with the detent elements 15 when the core 7 is mounted on the cone-shaped projection 2 and the core 7 rotates relative to the cassette 1. The support portion 16 and the arresting portion 13 are joined with one another at a region 10, which is a region at which shearing should take place as will be described below. The arresting portion 13 has a radially outer surface 12 which may be curved to correspond to the curvature of the guide surface 5 of the detent element 15, and an abutment surface 11 designed to abut against the detent surface 3 of the detent element 15.

The operation of the arrangement and the cooperation of the various components thereof are as follows:

When the core 7 is mounted on the cone-shaped projection 2, the arresting portion 13 of the arresting element 8 is juxtaposed with one of the surfaces 4, 5 or 3. When the take-up core 7 is rotated in the normal advancement direction of the film strip, that is, in the clockwise direction as illustrated in the drawing, the curved surface 12 of the arresting portion 13 of the arresting element 8 slides over the guide surface 5 of the detent element 15, being deflected thereby in the radially inward direction. When the surface 12 passes the edge 6, it reassumes its no-stress position, that is it moves radially upwardly into juxtaposition with the base surface 4. Preferably, the surface 12 does not come into contact with the base surface 4, but only comes in contact with the guide surface 5 upon further rotation of the core 7 relative to the casing 1.

On the other hand, when it is attempted to rotate the core 7 in the opposite, that is, counterclockwise, direction, the surface 11 of the arresting portion 13 of the arresting element 8 abuts against the detent surface 3 of one of the detent elements 15. When this happens, the abutment of the surfaces 11 and 3 will prevent rotation of the core 7 in the counterclockwise direction.

In order to assure that the arresting function is faultlessly performed, the surface 11 of the arresting portion 13 and the surfaces 3 of the detent element 15 do not extend in the radial direction, but rather extend at an angle of, for example, 30° to such direction, being inclined radially outwardly in the counterclockwise circumferential direction. As a result of this arrangement, the surface 11 will slide on the surface 3 when the core 7 is rotated in the counterclockwise direction so that the arresting portion 13 will be deflected in the radially outward direction upon abutment of the surfaces 11 and 3, thus making the arresting cooperation of the detent element 15 with the arresting element 8 more positive with increasing rotation of the core 7 in the counterclockwise direction.

As already mentioned above, under certain circumstances it is desirable to remove the film strip from the take-up core 7, such as for removal of the film strip from the film cassette through the picture window. Thus, it is necessary, under these circumstances, to free the take-up core 7 for rotation in the counterclockwise direction as seen in the drawing. For this purpose, the present invention provides a shearing projection 14 on the core 7. Inasmuch as the arresting element 8 is resiliently yieldable, it will be deflected by a force acting between the surfaces 11 and 3 during the rotation of the core 7 in the counterclockwise direction, in the clockwise direction relative to the core 7, until the arresting element 8, and particularly the support portion 16 thereof, abuts against the shearing projection 14, after which a further increase in such force will result in shearing of the arresting portion 13 from the support portion 16 at the region 10. Incidentally, the region 10 is so formed, such as weakened, as to assure that the shearing will take place only at the region 10 and not elsewhere along the arresting element 8, and that the shearing surface will be substantially planar, leaving no remainders of the support portion 13 attached to the arresting portion 16. Thus, when the arresting portion 13 is sheared from the support portion 16 of the arresting element 8, the take-up core 7 is free to rotate in any direction, that is, even in the counterclockwise direction in which it was unable to rotate prior to the shearing of the arresting portion 13. In this manner, the exposed film strip can be withdrawn from the take-up core 7.

As also illustrated in the drawing, a pair of protective projections 9 is arranged alongside the arresting element 8, preferably being parallel to and coextensive with the support portion 16 of the arresting element 8. The protective projections 9 are spaced from the arresting element 8 in the circumferential direction of the core 7, and each of them has a marginal zone 19 which may be preferably located at the same or greater distance from the axis of rotation of the core 7 than the arresting element 8, such protective projections protecting the arresting element 8 from suffering damage.

Finally, the core 7 may include a stub 17 which is circumferentially surrounded by an annular portion 18 upon which the film strip is to be wound. The arresting element 8 may then be integral with the stub 17 so that it is separated from the film strip accommodating space of the casing 1 by the annular portion 18. In this manner, the arresting portion 13 of the arresting element 8 which is severed from the support portion 16 in the manner that has been discussed previously is prevented from entering the above-mentioned accommodating space so that it cannot come into contact with the film strip being unwound from the annular portion 18 of the core 7 and cannot scratch or otherwise damage the film strip.

It will be understood that each of the elements described above, or two or more together, may also find a useful application in other types of constructions differing from the types described above.

While the invention has been illustrated and described as embodied in a film cassette, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a film cassette, a combination comprising a casing; a take-up core rotatable in opposite directions about an axis of rotation; means for normally arresting said core against rotation in one of said direction, including at least one detent member on said casing and having a detent surface projecting into an annular path surrounding said axis of rotation, and a guide surface which is curved inwardly of said path; an arresting element on said core rotatable therewith and extending axially thereof, said arresting element being elastically biased in direction outwardly of said path so as to engage and slide over said guide surface when said core rotates in the opposite direction but to abut against said detent surface when said core rotates in said one direction; and means defining a predetermined break-away locus on said arresting element so that, when the latter abuts said detent surface and said core is thereafter subjected to a predetermined elevated torque, said arresting element will be sheared off at said locus by a force acting in direction transverse to the direction of elongation of said arresting element.

2. A combination as defined in claim 1, wherein said arresting element includes a support portion connected to said core, and an arresting portion cooperating with said detent member and connected to said support portion, said break-away locus being defined between said support portion and said arresting portion of said arresting element.

3. A combination as defined in claim 1, wherein said arresting element is an integral part of said core.

4. A combination as defined in claim 1, wherein said arresting element includes at least a resiliently yieldable portion.

5. A combination as defined in claim 1, wherein said arresting element includes an arresting portion which cooperates with said detent member; and wherein said arresting portion has a radially outer surface which is curved in conformity with said guide surface.

6. A combination as defined in claim 1, wherein said detent surface and said guide surface meet at an edge; and wherein said detent surface is inclined from said edge in said one direction of rotation.

7. A combination as defined in claim 1, wherein said core includes a stub and an annular portion circumferentially surrounding said stub; and wherein said arresting element is connected to said stub.

8. In a film cassette, a combination comprising a casing; a take-up core mounted in said casing for rotation in opposite directions; means for arresting said core against rotation in one of said directions, including an arresting element connected to said core for joint rotation therewith and having a support portion, biasing means for urging said arresting element toward a position in which said arresting element moves in a path during said joint rotation, and at least one detent member on said casing which projects into said path and has a detent surface against which said arresting element abuts when moving in said one direction, said detent member also having a curved guide surface which deflects said arresting element out of said path when moving in the opposite direction; and protective projections surrounding said support portion and spaced therefrom in the circumferential direction of said core.

9. A combination as defined in claim 8, wherein said protective projections are substantially parallel to said support portion and substantially coextensive therewith.

10. The combination as defined in claim 8; wherein said support portion is connected to said core, and said arresting element includes an arresting portion connected to said support portion and cooperating with said detent member; and further comprising a shearing projection on said core at the trailing one of said protective projections when considered in said one direction of rotation and operative for shearing said arresting portion from said support portion when a force exerted upon said arresting portion by said detent member during said rotation in said one direction exceeds a predetermined magnitude.

* * * * *